US006301034B1

(12) United States Patent
Speciale

(10) Patent No.: US 6,301,034 B1
(45) Date of Patent: Oct. 9, 2001

(54) PULSED LASER MICROPHONE

(76) Inventor: John R. Speciale, 7710 Gene Dr., Wonder Lake, IL (US) 60097-9332

(*) Notice: Subject to any disclaimer, the term of this patent is extended or adjusted under 35 U.S.C. 154(b) by 0 days.

(21) Appl. No.: 08/955,602

(22) Filed: Oct. 22, 1997

(51) Int. Cl.[7] ...................... H04B 10/00

(52) U.S. Cl. .................... 359/151; 359/149; 359/150

(58) Field of Search .................... 359/149, 150, 359/151

(56) References Cited

U.S. PATENT DOCUMENTS

| | | | | |
|---|---|---|---|---|
| 1,709,762 | | 4/1929 | Zworykin . | |
| 3,470,329 | | 9/1969 | Young | 356/112 |
| 3,622,791 | | 11/1971 | Bernard | 250/199 |
| 4,412,105 | | 10/1983 | Muscatell | 179/121 R |
| 4,479,265 | | 10/1984 | Muscatell | 455/605 |
| 4,740,086 | * | 4/1988 | Oehler | 356/432 |
| 5,200,610 | * | 4/1993 | Zuckerwar | 250/227 |
| 5,249,163 | * | 9/1993 | Erickson | 367/149 |
| 5,566,135 | * | 10/1996 | MacLeod | 367/149 |
| 5,889,278 | * | 3/1999 | Richard | 250/214 |
| 5,995,260 | * | 11/1999 | Rabe | 359/150 |

* cited by examiner

*Primary Examiner*—Leslie Pascal
*Assistant Examiner*—Agustin Bello
(74) *Attorney, Agent, or Firm*—Roper & Quigg

(57) ABSTRACT

A microphone and method of use in which pulsed laser light is directed against a reflective diaphragm which is vibrated by sound waves thereby modulating the pulsed laser light reflected from the diaphragm. The modulated, pulsed laser light is transmitted from the microphone for conversion into digital, electrical signals or is converted to digital, electrical signals in the microphone and transmitted therefrom as digital signals.

12 Claims, 2 Drawing Sheets

PULSED LASER MICROPHONE

BACKGROUND OF THE INVENTION

1. Field of the Invention

This invention relates to transmission of sound. In one of its aspects it relates to microphones. In another of its aspects, it relates to lasers. In another of its aspects, it relates to pulsed lasers. In another of its aspects, it relates to the use of modulated, pulsed laser light in the transmission of sound. In yet another aspect, it relates to reduction of electrical interference in the transmission of sound from a microphone. In yet another aspect of the invention, it relates to the elimination of electrical wiring from a microphone to a reception point.

2. Description of the Prior Art

In general, the most common form of microphone can be described as a diaphragm which is exposed to sound waves with the diaphragm coupled in some way with an electrical receiver that translates the vibrations of the diaphragm into electrical signals that can be transmitted, recorded or amplified. From the earliest history of electrical sound reproduction emphasis has been given to providing microphones that are progressively less cumbersome and at the same time are capable of reducing distortion of the sound passed through them. The use of electrical wiring to connect the body of the microphone to an electrical receiver and the attachment of electrical wiring directly to the diaphragm contribute to electrical and mechanical interference with the quality of the transmitted sound.

To overcome these problems, the conversion of sound waves into modulated light has been considered as a means to efficiently bridge the conversion of sound into electrical signals. The prior art, therefore, discloses the use of laser and other light beams in the conversion of sound waves into electrical signals.

U.S. Pat. Nos. 1,709,792; 3,470,329 and 3,622,791 all set out microphones that use light to convert sound waves to electrical signals based on the principles of an interferometer.

U.S. Pat. No. 4,412,105 discloses a system in which a microphone has a cylindrical outer housing with a plurality of circumferentially spaced openings for the entry of sound waves and a cylindrical inner housing positioned concentrically inside the outer housing so that laser light projected into the space between the housings is modulated by sound waves entering the outer housing and the modulated laser light is received by a plurality of analogous photo detectors which produce electrical signals corresponding to the sound waves entering the outer housing by measuring the intensity of the fluctuating (modulated) laser stream which can be reflected from a vibrating diaphragm. This patent specifically seeks the elimination of a vibrating diaphragm in the conversion of sound waves to electrical signals, but some embodiments of the invention show the use of vibrating diaphragms. Detection of the modulation of the laser light is based on direct interpretation of the modulation of the laser light into analog signals.

U.S. Pat. No. 4,479,265 discloses a microphone system in which two aligned beams of laser light, one of which is delayed in relation to the other and is reflected by an object in motion, are used to produce an interference pattern that can be sensed by a light sensor placed in the path of the aligned beams. Detection of the modulation of the laser light, as in the discussion above, is based on direct interpretation of the modulation of the laser light into analog signals.

3. Objects of the Invention.

It is therefore an object of this invention to convert sound waves to modulated, pulsed laser light for the purpose of transmitting the modulated, pulsed laser light to a location at which the modulated, pulsed laser light is converted to digital, electrical signals.

It is another object of this invention to provide apparatus by which sound waves can be converted to modulated, pulsed laser light and the modulated, pulsed laser light can be transmitted to a location at which the modulated, pulsed laser light is converted to digital, electrical signals.

These and other objects and advantages of the present invention will become evident to those skilled in the art by reference to the following description and drawing and the appended claims.

SUMMARY OF THE INVENTION

According to this invention method and apparatus are provided by which sound vibrations are admitted into the housing of a microphone that contains a diaphragm capable of oscillating freely in response to sound vibrations and having a reflective surface from which pulsed laser light directed thereagainst is reflected to means for collecting reflected, pulsed laser light that has been modulated by the oscillation of the diaphragm. Pulsed laser light is directed against the reflective surface of the diaphragm, is modulated by the vibration of the diaphragm and the reflected, modulated, pulsed laser light is collected within the microphone for transmission to means for converting the modulated, pulsed laser light to digital signals or the modulated, pulsed laser light is converted to digital signals within the microphone.

BRIEF DESCRIPTION OF THE DRAWING

In the various figures of the drawing, like items are assigned like numbers.

DETAILED DESCRIPTION OF THE INVENTION

According to this invention a microphone is provided in which sound vibrations are admitted into a housing that contains: means for directing pulsed laser light against a reflective surface of a diaphragm; a diaphragm capable of oscillating freely in response to sound vibrations and having a reflective surface from which pulsed laser light directed thereagainst is reflected to means for collection and transmission or means for directly converting the reflected, pulsed laser light to digital signals.

According to an embodiment of the invention pulsed laser light is transmitted into the microphone from an external source through a fiber optical cable. In another embodiment, the pulsed laser light is generated by a pulsed laser emitter located in the microphone.

According to one embodiment of the invention, at a collection zone, operable means are provided for collecting the reflected, modulated pulsed laser light and transmitting it from the microphone.

According to another embodiment of the invention, at a collection zone, operable means are provided for collecting and converting the reflected, pulsed laser light into digital, electrical signals for transmission from the microphone and further operable means are provided for transmitting the electrical signals from the microphone.

According to the invention, a method is provided for collecting and transmitting sound using a microphone. In this method sound vibrations are admitted through at least one port in a microphone housing causing a vibration responsive diaphragm retained in the housing to oscillate in response to the sound vibrations. Pulsed laser light is directed against a reflective surface of the diaphragm, modulated by the vibration of the diaphragm and the modulated, pulsed laser light is reflected from the surface. The modulated, pulsed laser light is collected at a collection zone and, in one embodiment of the invention, transmitted from the microphone.

In another embodiment according to the method of the invention, the modulated, pulsed laser light is collected at the focal point, converted into digital electrical signals for transmission from the microphone and the digital signals are transmitted from the microphone.

Figure 1:
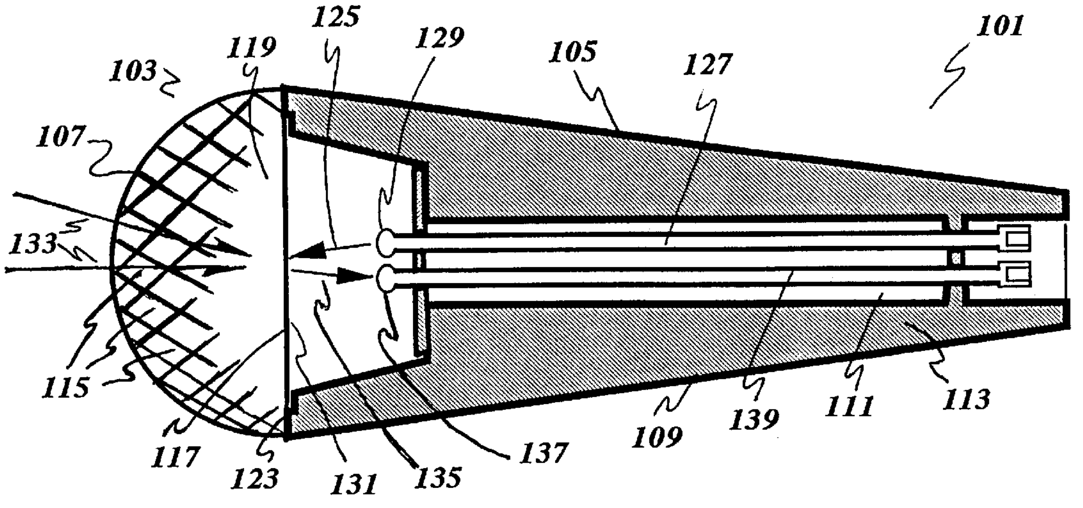
FIG. 1 is a cut-away side view of a microphone according to a first embodiment of the invention.
Figure 2:
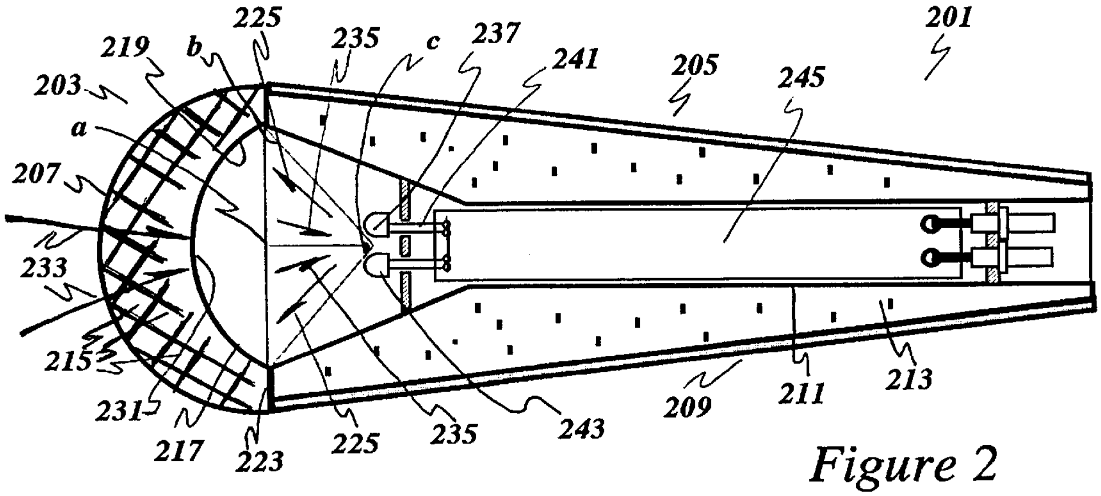
FIG. 2 is a cut-away side view of a microphone according to a second embodiment of the invention.

Referring to FIGS. 1 and 2, the apparatus and method for one embodiment of the invention will be described.

An operable microphone 101,201 according to this invention is composed of a body 103,203 which is shown, as seen from the outside, with a grip portion 105,205 and a diaphragm cover portion 107,207 which together provide cover and support for the internal components. The cover and support portions can be of any convenient size and shape but are shown here for a hand-held microphone as a truncated, hollow cone for the grip and a hollow ovoid for the diaphragm cover. If the microphone is not to be held in the hand, it can be fitted into a holder designed for that purpose or can have attached to the microphone itself means by which it can be attached to a support or stand alone.

The grip portion 105,205 is sized to be held comfortably and to provide adequate housing for the internal components. The grip portion can be constructed of light metal or, preferably, plastic or can be molded as concentric cones 109,209,111,211 containing a layer of insulation 113,213 therebetween.

The diaphragm cover 107,207 contains sufficient openings 115,215 to admit sound vibrations into the interior of the housing while still being of sufficient strength to protect the internal elements, particularly the diaphragm 117,217. Any molded covering of metal or, preferably, plastic pierced with apertures or windows can be joined to the body by snapping onto or screwing onto the grip portion. A molded, plastic, snap-on screen is the presently preferred diaphragm cover.

The diaphragm 117,217,317,417,517, can be flat or arced in the shape of a disc or dome- or any portion of a disc or dome-located between the diaphragm cover and the grip portion and at least partially forming a partition between the area enclosed by the grip portion and the area enclosed by the diaphragm cover.

If the diaphragm is arced, the arc can be part of a true sphere so as to collect light from the concave surface thereof at a focal point. In a preferred embodiment, the diaphragm is molded into a circular dome portion (see also 521 FIG. 5). The circular dome need not have a complete circular cross-section but can be any portion from a band to the complete circular dome.

In any of its forms at least a portion of a rim 123,223, 323,423,523, of the diaphragm should extend outwardly from the band or disc portion to provide means for retaining the diaphragm in place. The rim can be sealed to the end of the grip portion or held between the grip portion and the diaphragm cover, but the oscillating portion 119,219,319, 419,521 of the diaphragm is, itself, maintained free of attachments to provide maximum response to sound vibrations.

Figure 3:
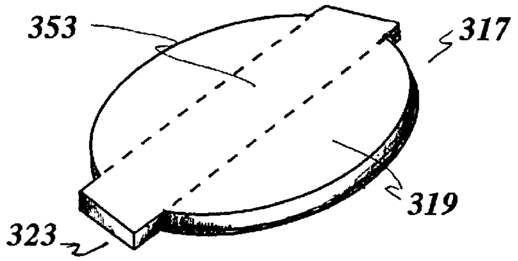
FIG. 3 is an isometric projection of a diaphragm in the form of a flat surface.

Referring to FIG. 3, the diaphragm 317 is shown as a flat surface portion 319 which in operation is seated against the grip portion of the microphone. Both the side of the band facing the grip portion and the side of the band facing the diaphragm cover form a flat surface with the side facing the grip portion having a mirrored finish capable of reflecting modulated, pulsed light. The diaphragm can be a full planar circle with a seating edge all the way around the circle or can (as illustrated in FIG. 3) have a plurality of tabs 323 that extend from the circle for a sufficient length to secure the diaphragm in place. The diaphragm can also be any portion of the planar circle, such as a band of material across a diameter of the circle 353 (as shown by dotted lines in FIG. 3) or any flat configuration that is capable of being held in place, vibrating in response to sound waves and of sufficient size to reflect pulsed laser light beamed againgst it.

Figure 4:
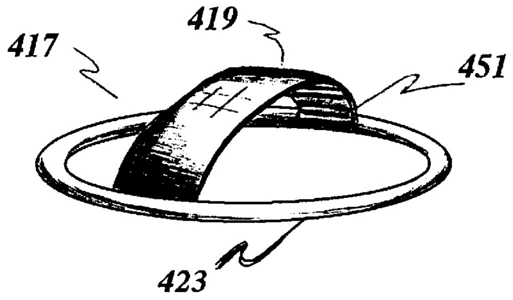
FIG. 4 is an isometric projection of a diaphragm in the form of an arced band.

Referring to FIG. 4, the diaphragm is shown as a band of an arced dome 419 which in operation is seated against the grip portion of the microphone. Both the side facing the grip portion and the side of the band facing the diaphragm cover form a portion of an arced surface with the side facing the grip portion having a mirrored finish capable of reflecting modulated, pulsed light. The diaphragm can be a full, arced dome with a seating edge all the way around the circle or can have a plurality of tabs that extend from the dome for a sufficient length to secure the diaphragm in place. The diaphragm can also be any portion of the dome, i.e. any arced configuration that is capable of being held in place, vibrating in response to sound waves and of sufficient size to reflect pulsed laser light beamed againgst it.

Figure 5:
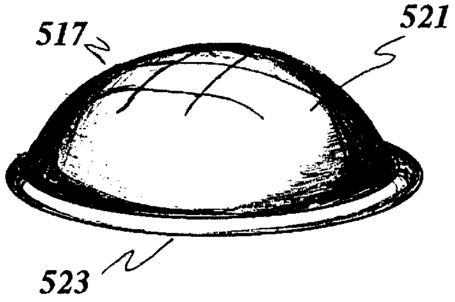
FIG. 5 is an isometric projection of a diaphragm in the form of a circular dome.

Similarly, referring to FIG. 5, the diaphragm 517 is shown as a specific embodiment in which the arced dome is a spherical dome 521 which in operation is seated against the grip portion of the microphone. Both the side facing the grip portion and the side of the dome facing the diaphragm cover form a spherical surface with the side facing the grip portion, the concave side, having a radius that is the distance to the focal point of light reflected from this surface.

For the embodiment shown in FIGS. 2 and 5, the important relationship is that the arc of the reflecting surface is such that the pulsed laser light reflected from the arc is focussed at the desired point within the microphone. The arc is dependent on the desired distance across the concave face of the diaphragm, i.e. how much reflecting surface is desired for the diaphragm or how much diaphragm surface can be contained in a particular housing. The arc of the diaphragm will always be an arc of the circumference of the circle that has a radius that is the distance from the arc to the focal point. The design parameters for a microphone are determined by configuring the volume required to accommodate the transmission equipment in the housing portion of the microphone, such as the grip portion of a hand held microphone, and to provide the focal length required by the reflected light of a particular diaphragm.

Referring to FIG. 2, a hand held microphone illustrates an embodiment of this invention in which a dome diaphragm is set in a 1 inch diameter housing. Since the dome must have a spherical curvature, the distance of the focus from the reflecting surface is mathematically determined based on the fact that the angle made between a radius of the spherical curvature drawn from either end of the arc of the dome and a radius of the spherical curvature that bisects the arc of the dome is 45°. Each of the shorter legs ab and ac of the triangle abc are then 0.5 inch and bc, the longer leg or hypotenuse of triangle abc, is determined from: sine 45°=ab/bc. The distance from the inner surface of the dome to the focal point is then 0.707 =0.5 inch/bc or bc=0.707 inch.

It has also been determined that by marking the reflecting, surface with interrupted, non-reflective markings such as bar codes 451 (see FIG. 4) or bull's eyes that the reception of the modulated light transmitted from the surface is improved.

The diaphragm has been noted as having a surface that is reflective. The diaphragm can be made of a material that is both moldable and reflective such as Mylar, a trademark of I. E. duPont Company, or it can be molded of a thin but structurally sound polymeric material such as nylon, polyolefins, olef in copolymers and the like or a metal such as aluminum and the like and coated on the reflecting side with a thin layer of light reflective material such as silver.

Referring to FIG. 1, according to one embodiment of the invention, incoming pulsed laser light 125 is generated from an external source and transmitted through a first, laser, fiber optical cable 127 into the interior of the microphone 101 where it is directed through optical lenses 129 against the flat, reflective surface 131 of the diaphragm 117.

The diaphragm is vibrated by sound waves 133 entering the microphone through openings 115 in the diaphragm cover 107. The vibration of the diaphragm produces modulated, pulsed laser light 135 that is reflected by the flat, reflective surface 131.

At the collection zone 137, the modulated, pulsed laser light is picked up by a second, laser, fiber optical cable 139 which, in this embodiment of the invention, is spaced from the first, laser, fiber optical cable to allow the pulsed laser beam from the first, laser, fiber optical cable 127 to reflect at a 90° angle to the second, laser, fiber optical cable 139. The second cable transmits the modulated, pulsed laser light to equipment exterior to the microphone for conversion into electrical signals.

Referring now to FIG. 2, in another embodiment of the invention, while the structure of the microphone remains as in the previously described embodiment the source of the pulsed laser light and manner of collection can be changed. Within the microphone itself a pulsed laser optical transmitter 241 can be positioned to transmit pulsed laser light 225 against the concave, reflective surface 231 of the diaphragm 217. The diaphragm is vibrated by sound waves 233 entering the microphone through openings 215 in the diaphragm cover 207. The vibration of the diaphragm produces modulated, pulsed laser light 235 that is reflected and focussed by the concave, reflective surface 231.

At the collection zone 237, here a focal point, the modulated, pulsed laser light is picked up by a laser optical receiver 243 capable of transforming the modulated, pulsed laser light into digital electrical signals which are transmitted from the microphone by an electrical signal transmitter 245. The audio signals can then be picked up by an electrical signal receiver for further processing.

It should be apparent that the means for transmitting the pulsed laser light against the diaphragm and the means for receiving the modulated, pulsed laser light from the diaphragm, as described above, can be paired so that the first, laser optical cable 127 of FIG. 1 can be used with the laser optical receiver 243 of FIG. 2 and electrical signal transmitter 245 of FIG. 2 or the pulsed laser optical transmitter 241 of FIG. 2 can be used with the second, laser optical cable 139 of FIG. 1.

Figure 6:
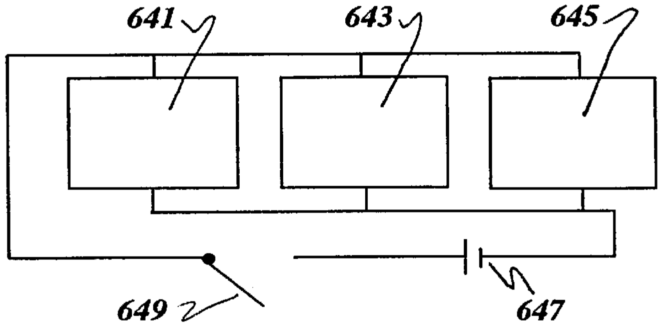
FIG. 6 is a schematic diagram of the electrical circuitry of a microphone of this invention.

Referring now to FIG. 6, using any or all of a pulsed laser optical transmitter 641 or a laser optical receiver 643 or an electrical signal transmitter 645, the microphone is also equipped with a power source and an on-off switch for energizing any or all of the transmitter/receiver devices. The power source preferably has battery power contained in the microphone, but can also be powered from an external position such as battery power wired to a hand held microphone from a wrist band. The circuitry supplies power from a battery 647 to the circuit board of a pulsed laser optical transmitter 641, of a laser optical receiver 643 and/or of an electrical signal transmitter 645, any or all of which can be present, by the on-off positioning of the switch 649. As described above, the use in this circuitry of the pulsed laser optical transmitter or the combination of the laser optical receiver and the electrical signal transmitter, which can be for transmitting either analog or digital signals, is optional.

Figure 7:
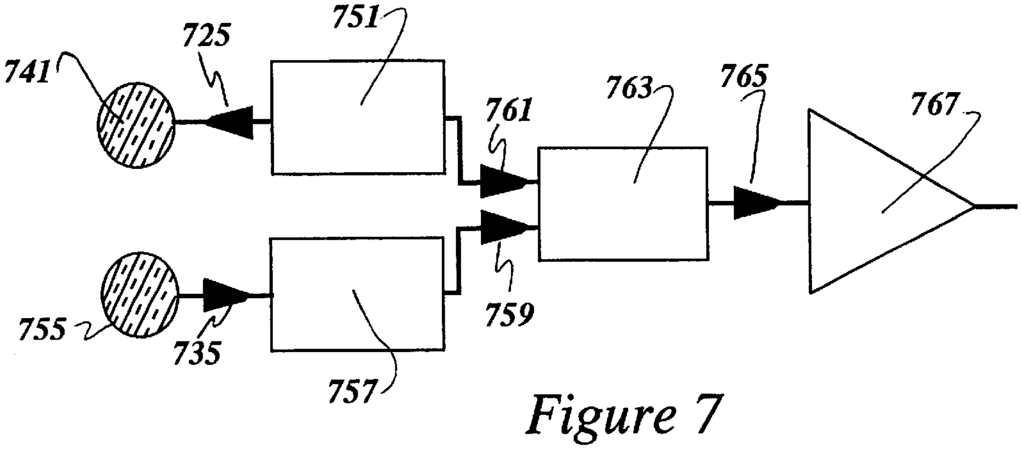
FIG. 7 is a schematic diagram of the pulsed laser generation, collection and conversion apparatus of this invention.

The principles and equipment upon which the generation of pulsed laser light and the collection of modulated, pulsed laser light with comparison of the pulse frequency to produce a resolved and readable audio signal output is based, is known in the art, particularly to those familiar with the operation of CD players. Referring to FIG. 7, a pulsed laser driver 751 produces pulsed laser light 725 that is directed outward by a laser emitter 741. This pulsed laser light can be directed against the reflective surface of a diaphragm of a microphone of this invention as shown in FIG. 2 or can be directed into a fiber optical cable, as shown in FIG. 1, and thereby transmitted to a microphone of this invention. The modulated, pulsed laser light 735 reflected from a diaphragm oscillating in response to sound waves is sensed, either directly or as transmitted from the collection zone by a fiber optical cable, by a laser optical receiver, here a photo transistor 755, and transmitted to a laser receiver amplifier 757 to produce a modulated output signal 759. The modulated output signal of the laser receiver amplifier is compared with a pulse frequency reference signal 761 from the pulsed laser driver 751 using a comparator 763 to produce a resolved, audio signal output 765 in digital signals which can be amplified with a signal amplifier 767 and transmitted to further processing. This processing can include conversion into analog signals.

The equipment required for the process set out above can be of such small dimensions that it can be contained in a hand-held microphone to provide the pulsed laser stream and collection apparatus used along with a diaphragm as an apparatus useful in a process of this invention. When all of the equipment is contained in the microphone the resolved audio signal output can be carried by wire or, by including a suitable transmitter in the microphone, can be transmitted through the air to additional equipment for further processing.

All of the equipment set out in FIG. 7 can be located at a position remote from the microphone with the pulsed laser light transmitted into and through fiber optical cable to the microphone and the modulated, pulsed laser light collected in a fiber optical cable for transmission through the cable to the remote position. This arrangement allows the use of a single pulsed laser driver to supply a multiplicity of microphones.

A pulsed laser driver with laser emitter can be included in the microphone equipment with the modulated, pulsed laser light and the pulse frequency reference signal collected in fiber optical cables for transmission through the cable to a remote position for comparison.

The pulsed laser light can be gererated and transmitted into and through fiber optical cable to the microphone from that remote position and the modulated, pulsed laser light can be collected by a photo transistor and processed in the microphone into a modulated, digital output signal for transmission by wire to a comparator at the remote position.

The principle advantage of this microphone system over those presently known is the reduction or elimination of electrical interference in a sound transmission system. Since the microphone has no electromagnetic pick-up coils, the system is not affected by electromagnetic interference (EMI) radiations from electrical cables and other electrical devices. It is also relevant that without a pick-up coil the greatly reduced mass of the diaphragm increases the sensitivity and compliance of the diaphragm.

Since the output of this microphone is converted directly to digital signals it can be adapted to interface with any conventional audio microphone mixing system or can be employed in other types of audio devices. The digital signals can also be converted to analog signals to interface with conventional audio microphone mixing systems or employed in other types of audio devices.

The invention thus being described, it will be obvious that the invention can be varied in many ways. Such variations are not to be regarded as a departure from the spirit and scope of the invention and all such modifications are intended to be included within the scope of the following claims.

That which is claimed is:

1. A microphone comprising:

a housing capable of admitting sound vibrations wherein the housing contains:

a means for producing and directing pulsed laser light against a reflective surface of a diaphragm;

a diaphragm capable of oscillating freely in response to sound vibrations and having a reflective surface aligned to reflect pulsed laser light directed thereagainst to a collection means for reflected, pulsed laser light;

a laser optical receiver capable of converting the reflected, pulsed laser light into signals chosen from the group consisting of analog signals and digital signals wherein the laser optical receiver comprises (a) as collection means (1) a photo transistor which senses the reflected, pulsed laser light; (2) a laser receiver amplifier which receives amplified signals from the receiver amplifier and compares them to a pulse frequency reference signal and (b) conversion means for converting the reflected, pulsed laser light into signals for transmission from the microphone; and means for transmitting the converted signals from the microphone.

2. A microphone according to claim 1 wherein the means for collecting and converting the reflected, pulsed laser light is a laser optical receiver capable of converting the reflected, pulsed laser light into digital signals.

3. A microphone according to claim 1 wherein the means for collecting and converting the reflected, pulsed laser light is a laser optical receiver capable of converting the reflected, pulsed laser light into digital signals.

4. A microphone according to claim 1 wherein the means for directing pulsed laser light against the reflective surface of the diaphragm is a pulsed laser optical transmitter.

5. A microphone according to claim 1 wherein the diaphragm comprises a reflective surface in the shape of a symmetrical dome and means for directing pulsed laser light against the reflective surface of the diaphragm and means for collecting reflected, pulsed laser light lie on radii of the symmetrical dome within a cone projected by the radii of the dome.

6. A microphone according to claim 1 wherein the reflective portion of the diaphragm is marked with a nonreflective pattern.

7. A method for collecting and transmitting sound using a microphone, wherein the method comprises:

admitting sound vibrations through at least one port in a microphone housing;

allowing a vibration responsive diaphragm retaining in the housing to oscillate in response to the sound vibrations:

producing and directing pulsed laser light against a reflective surface of the diaphragm thereby providing reflected, modulated pulsed laser light;

collecting the reflected, modulated pulsed laser light and converting the reflected, modulated pulsed laser light using a laser optical receiver capable of converting the reflected, pulsed laser light into signals chosen from the group consisting of analog signals and digital signals wherein (a) the collecting comprises (1) sensing the reflected, pulsed laser light with a photo transistor; (2) receiving the signal transmitted from the phototransistor into a laser receiver amplifier and (3) comparing the amplified signals from the receiver amplifier to a pulse frequency reference signal in a comparator and (b) the converting comprises converting the reflected, modulated pulsed laser light into signals for transmission from the microphone; and transmitting the converted signals from the microphone.

8. A method according to claim 7 wherein a laser optical receiver capable of converting the reflected, modulated pulsed laser light into digital signals collects and converts the reflected laser light.

9. A method according to claim 7 wherein a laser optical receiver capable of converting the reflected, modulated pulsed laser light into digital signals collects and converts the reflected, modulated pulsed laser light.

10. A method according to claim 7 wherein a laser optical transmitter directs pulsed laser light against the reflective surface of the diaphragm.

11. A method according to claim 7 wherein the diaphragm comprises a reflective surface in the shape of a symmetrical dome and means for directing pulsed laser light against the reflective surface of the diaphragm and means for collecting reflected, pulsed laser light lie on radii of the symmetrical dome within a cone projected by the radii of the dome.

12. A method according to claim 7 wherein the reflective portion of the diaphragm is marked with a nonreflective pattern.

* * * * *